No. 833,824. PATENTED OCT. 23, 1906.
J. CALLOW.
APPARATUS FOR MOLDING, SHAPING, AND COMPRESSING DOUGH, &c.
APPLICATION FILED OCT. 24, 1905.
4 SHEETS—SHEET 3.
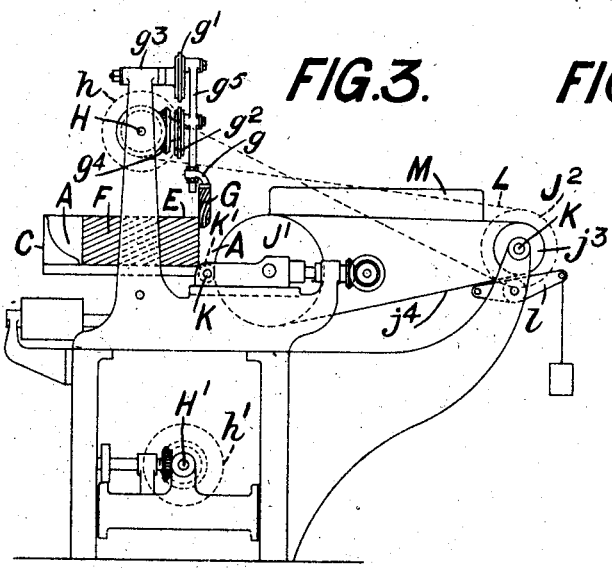
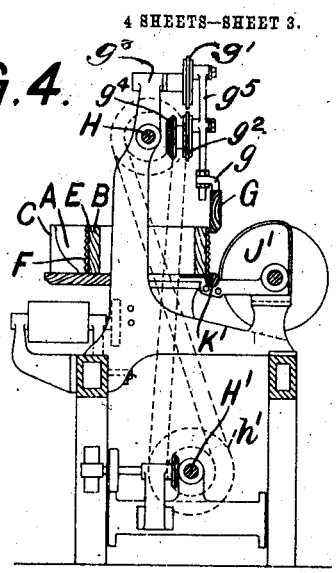
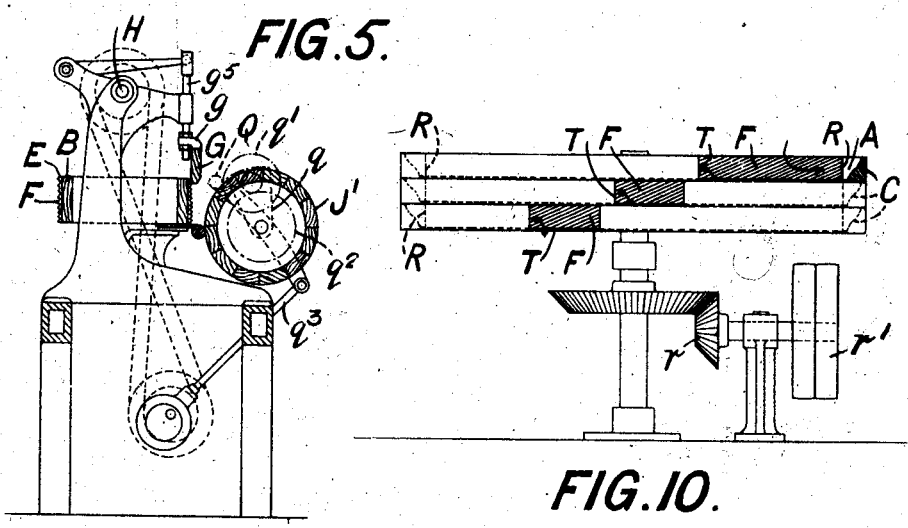
Witnesses
Inventor
John Callow, No. 833,824. PATENTED OCT. 23, 1906.
J. CALLOW.
APPARATUS FOR MOLDING, SHAPING, AND COMPRESSING DOUGH, &c.
APPLICATION FILED OCT. 24, 1905.

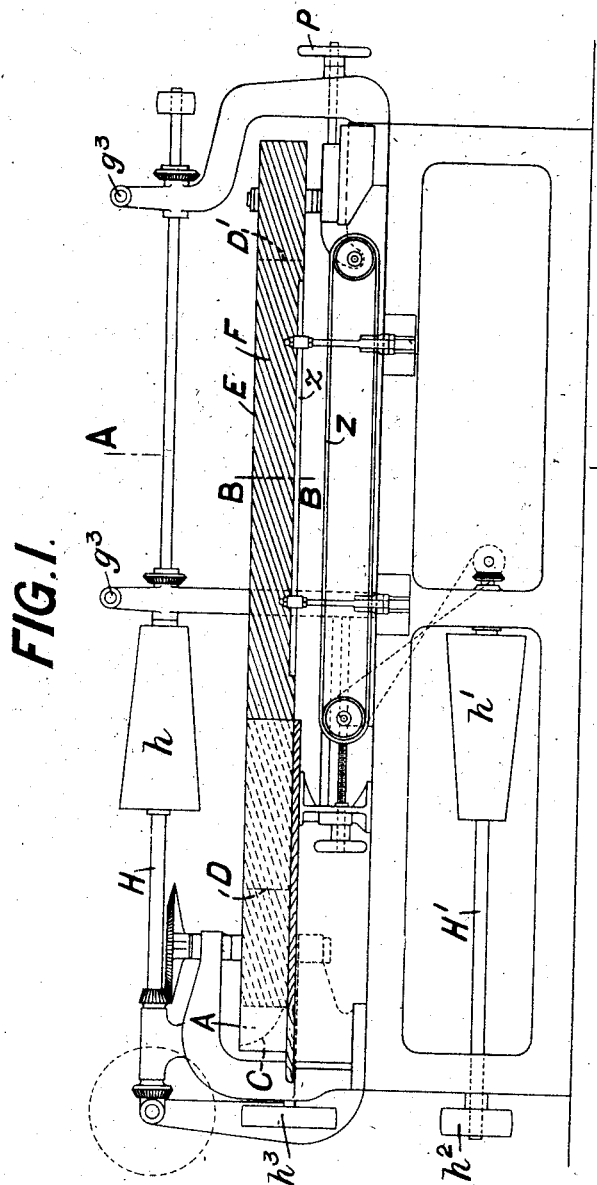

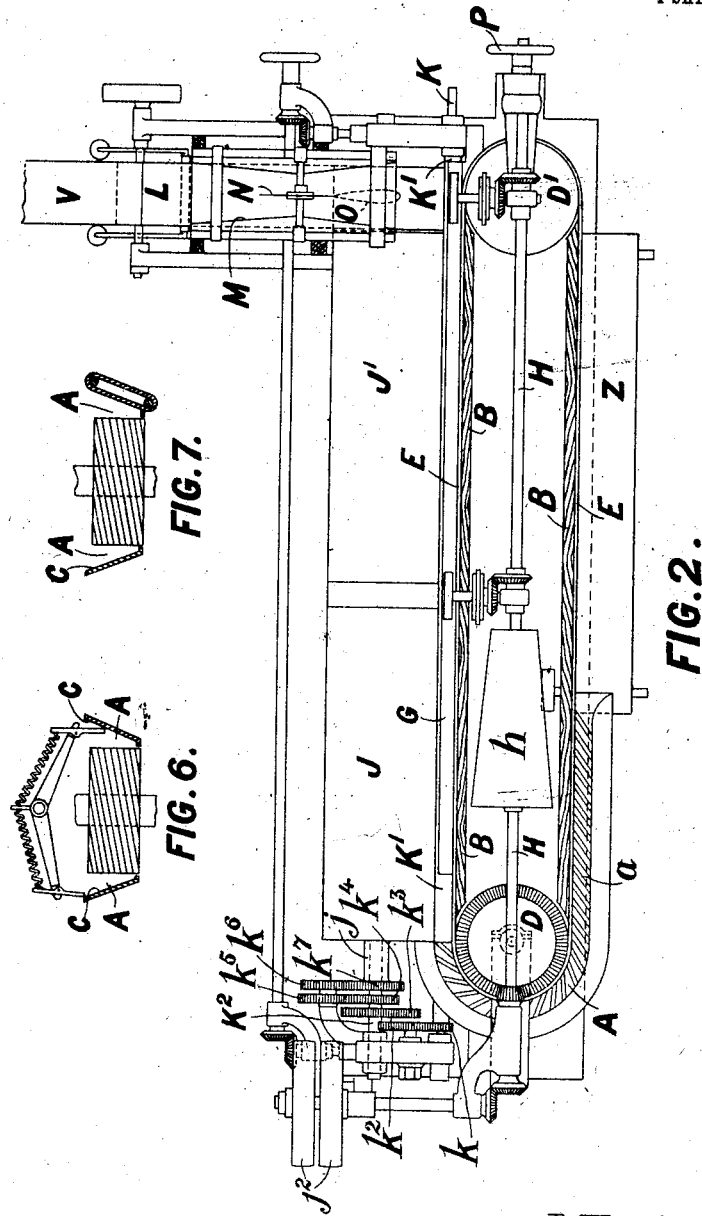

4 SHEETS—SHEET 4.

Witnesses
Inventor
John Callow,
By Mason Fenwick Lawrence
Attys.

UNITED STATES PATENT OFFICE.

JOHN CALLOW, OF LIVERPOOL, ENGLAND.

APPARATUS FOR MOLDING, SHAPING, AND COMPRESSING DOUGH, &c.

No. 833,824.

Specification of Letters Patent.

Patented Oct. 23, 1906.

Application filed October 24, 1905. Serial No. 284,165.

*To all whom it may concern:*

Be it known that I, JOHN CALLOW, foreman baker, a subject of the King of Great Britain, residing at Liverpool, in the county of Lancaster, England, have invented certain new and useful improvements in apparatus for molding, shaping, and compressing dough and like plastic materials, (for which application has been made in Great Britain, No. 26,007, dated November 29, 1904,) of which the following is a specification.

This invention relates to apparatus for molding, pressing, and shaping dough or like plastic material into lumps of suitable size and weight and to its treatment intermediate the usual dividing-machine and the molding, and has for its object the effecting of the same by mechanical means, the dough being submitted to a treatment which first permits of the reformation of the gases in the same, which gases have been to a certain extent expelled by the pressure exerted in the divider—that is to say, permits of the proving of the dough—after which the lumps of dough are further submitted to a molding action in which their skin is continually drawn tight over the lump being so acted on and the gases allowed to further escape, which expels the gases from it, and, while molding it slightly, continually draws the skin tight over the lump being treated.

In order that the invention may be fully understood, reference will now be had to the accompanying drawings, in which—

Figure 11:
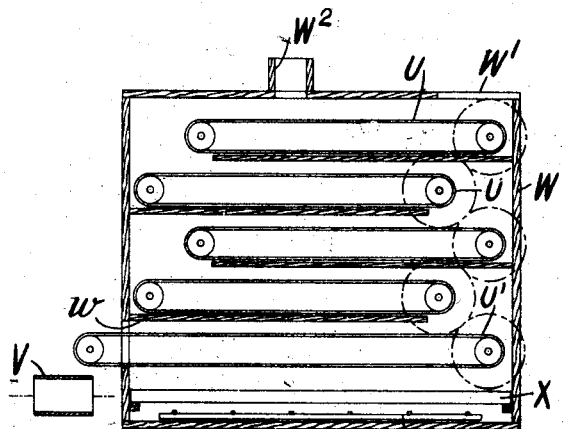
Figure 12:
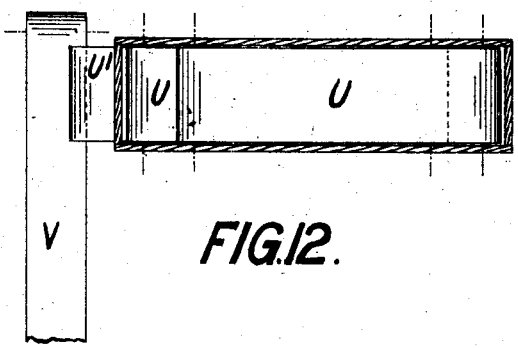

Figure 1 is an elevation of the molding-machine in partial section; Fig. 2, a plan view of the same; Fig. 3, an end view; Fig. 4, a sectional view taken on the line A A of Fig. 1. Fig. 5 shows a modification. Figs. 6 and 7 are detail drawings of further modifications. Figs. 8 and 9 are details showing two modified sections on the line B B of Fig. 1. Fig. 10 shows, more or less diagrammatically, a different form of construction of the machine shown in Figs. 1 and 4, while Figs. 11 and 12 are sectional elevation and plan view of the apparatus for carrying out the proving of the lumps of dough as they issue from the dividing-machine.

In carrying the invention into effect the molding-machine is provided with a trough A, into which the lumps of dough or like plastic material (hereinafter referred to as "dough") to be operated on are fed, the said trough A, if desired, being gradually reduced in width from the receiving to the discharge end, or, if desired, being made somewhat adjustable as to width at its discharge end.

The trough is horizontal, with a wall B, preferably vertical, on one side and the other wall C sloping or converging toward the vertical wall B at the bottom of the trough A. On each end of the machine, arranged on vertical axes, are guide-pulleys D D', round which is passed an endless traveling belt or conveyer E. The trough A is straight for part of its length and then curving round the guide-pulley D returns toward the opposite end of the machine. The conveyer E passes through the trough A and follows it throughout its entire length and lies in close proximity to one wall of the trough A and is provided with flexible ribs F, which are secured or arranged in an oblique position. The conveyer E being set in motion, the lumps of dough are fed into the trough A at one end, and the obliquity of the ribs is such as to constantly feed the lumps and pull the outer skin of the same downward toward the narrow bottom of the trough and fold the dough. This combined action, due to the sloping side C of the trough A and the opposing vertical face of the conveyer E, sets up a combined folding, rolling, and squeezing action, while the dough, being constantly forced to rotate, will receive pressure on all sides, which action will serve the purpose of molding and expelling gases.

As the lumps of dough are rolled along the trough by the travel of the conveyer E they are further acted upon by means of a press or ram G, which descends onto the dough so as to strike the same on the top and exert pressure on it. In the drawings this press or ram G is shown as suspended from a couple of vertical rods $g$, secured at two points to short cranks $g^5$ on revolving disks $g'$ and $g^2$, supported on the uprights $g^3$, one of the disks $g^2$ being integral or connected with a bevel-wheel $g^4$, connected with the upper longitudinal driving-shaft H. It will thus be seen that on the rotation of the shaft H the ram or press G is given a reciprocating movement up and down and also in its downward movement is moved somewhat along the trough A in the direction of the travel of the dough. This arrangement further secures a homogeneous, compact, and thoroughly-molded dough-loaf. Various other methods of carrying out this movement of the ram or press are shown.

As the lumps of dough issue from the trough A they are somewhat of peg-top form and, although suitable for "oven-bottoms" or "cottage-loaves," are not suitable as regards shape for "tin" bread. If, therefore, the lump of dough is to be used for the latter purpose or if it is divided into a number of parts, a second traveling belt Z is arranged as shown in Figs. 1, 8, and 9, which runs under a guide z. If the lump is simply to be rolled out somewhat in sausage form, the guide as shown in section in Fig. 8 is used— that is to say, a plane under surface. If, on the other hand, the lump of dough is divided into two parts, the cross-section shown in Fig. 9 is used—that is to say, with a dividing-rib $z'$.

In Fig. 5 the rod $q$ is simply shown as reciprocated in a suitable guide by means of a lever $q^6$, acted on by a suitable cam on the shaft H. In Fig. 6 a rocking-lever arrangement is shown, carrying fingers normally held by springs, so as to press down against the outer sloping wall C of the trough, the double lever rocking on a shaft oscillated from any suitable source, such as an eccentric. Further, if desired, the sloping sides C of the trough A may have ribs $a$ secured thereto, either obliquely or otherwise, being arranged opposite and in the reverse direction to the opposing ribs on the traveling band. This will to a certain extent have the same effect as the ram or pressure-board G.

In the preferable construction of the machine, and as shown in Figs. 2, 3, and 4, one side of the trough A instead of being provided with the sloping wall C is provided with continually-rotating rollers J J', which have the same effect as the ribs of the sloping side hereinbefore mentioned and are capable of working in connection with the presser-board G. These rollers work side by side, and preferably the roller J' works at a somewhat faster speed than the first roller J. A small roller K' on the shaft K rotates in the bottom of the trough A in the same direction as the rollers J J' and strips the same of any adhering dough and at the same time improves the closing of the dough.

As shown in the drawings, the method of drive is from the cone-pulley $h$ on the shaft H to the reversed cone-pulley $h'$ on the shaft H' and then by belt-gearing from the pulley $h^2$ to the pulley $h^3$, which drives a small pinion $k$, which meshes with a larger gear-wheel $k^2$, which latter by means of a further pinion $k^3$ on the same shaft drives the shaft $K^2$, which supports the two rollers J J'. The roller J' is keyed direct on this shaft, while the roller J is revolubly mounted on the same and is driven from the gear-wheel $k^4$ on the shaft $K^2$ through the two gear-wheels $k^5$ and $k^6$ to $k^7$, which is formed on the sleeve $j$ integral with the roller J. It will thus be seen that it is possible to obtain different speeds of rotation for the two rollers J J'. If desired, instead of these rollers J and J' it will be possible to provide a canvas belt, as shown in Fig. 7, which would pass over two small rollers, such as shown. In the arrangement of rollers shown in Fig. 5 an additional roller Q is provided, mounted on a pivotal bracket $q$, which also carries a pinion $q'$, with a gearwheel $q^2$ engaging with one end of the roller Q. The pinion $q'$ engages with the teeth $q^4$ on the roller $j'$, and the other end of the bracket $q$ is connected to an eccentric-rod $q^3$. The result of the arrangement is that the roller Q, while constantly rotating, is also given an oscillating movement, which helps to press the dough down in the trough A. A feed-roller $J^2$ is also provided, mounted on the shaft K. Over this feed-roller passes an endless conveyer-belt L, which is provided with a suitable tightening device, such as $l$. Located over this belt L is a tunnel-like structure or hood M, through which the lumps of dough pass after being placed on the outer end of the conveyer L. Through this hood M a rotary or other knife N works just in front of a guide-piece O. The object of this special feed device is to separate or cut the dough into two (or, if desired, more) pieces before it enters the trough A, the guide-piece O, being somewhat taper in form, further separating the pieces separated by the knife N.

As shown in Fig. 1, the pulley D' is provided with adjustable bearings capable of being tightened by means of the hand-wheel P. The pulley $J^2$ may be keyed on the shaft K or mounted revolubly thereon, in which case it is driven from the small pulley $j^3$ of the feeding device by means of the belt-pulley $g^4$; otherwise the whole of the machine is driven from the fast and loose pulley device $j^2$.

Fig. 10 shows a somewhat diagrammatically different form of machine for carrying out the operation. In this are shown a number of superimposed wheels R, lying in a horizontal plane and all secured to one shaft. About the periphery of each of these wheels is a guiding-piece or outer sloping wall C, which, together with the wheels R, makes a series of troughs A. The sides of the troughs are ribbed at F, as in the previous case, while there are openings T in the troughs to allow of the lumps of dough which are placed in the uppermost part to fall down from one to the other and to be operated upon by the respective wheels. Arrows indicate the course of the lumps of dough. The device is shown as driven by bevel-wheels $r$ and a fast and loose pulley device $r'$.

In order to give the lumps of dough time to recover themselves from the action of the divider before being treated by the molding-machine, the filling device, hereinafter referred to as the "proving" device, is utilized, reference being had to Figs. 11 and 12. In U are arranged to receive the lumps of dough as they issue from the divider. These lumps generally issue in sets of, say, four, according to the capacity of the divider and are caused to travel along each of the endless bands U, in turn falling from one to the other till they reach the lowermost band U', which is somewhat longer than the higher ones and conveys the lumps of dough onto a traveling band V, also shown in Fig. 2, which conveys them to the molding-machine. This traveling band V preferably travels at a speed which is a multiple of the speed of the bands U U', equal to the number of lumps of dough in one set—in the present case, say four. The speed of the bands as a whole is preferably arranged so that the lumps of dough take about a quarter of an hour to travel over the same to the molding apparatus. It is sometimes found desirable to hasten the proving of the lumps by aid of heat. For this purpose the bands U are placed in a casing W, from which the band U' projects, an orifice W' being arranged for the lumps of dough to enter the casing. The means for heating the lumps of dough in the drawings are shown as a tray X, adapted to hold water and heating means, such as gas-jets Y, arranged underneath the tray X. Baffles $w$ can be arranged in the casing, so as to cause the heated vapors to travel in a direction opposite to the travel of the lumps of dough. These vapors or heated air are allowed to escape by the opening W², if required.

The operation of the apparatus as a whole may be briefly summarized as follows: The lumps of dough as they issue from the divider fall onto the top of the bands U through the orifice W' and are slowly conveyed from the uppermost of these conveyers U and permitted to fall down onto the next, and so on till they reach the conveyer U', from whence they drop onto the conveyer V, by which they are carried one at a time onto the conveyer-band L and past the knife N and guide-piece O, where they are separated. They then fall into the trough A and are operated upon by the revolving rollers J' and J and by the traveling band or conveyer E, the latter rolling them along the trough, and the ribs F in the same constantly tending to force the dough down toward the bottom, the progression of the dough being continued to the end of the trough A, where they are discharged onto the shaping device Q $q$ $q'$ and taken away by any suitable means.

The conveyer may be arranged to travel at a uniform speed or intermittently, as it is found necessary to allow time for the gases to escape in the case of the lighter flours.

I declare that what I claim is—

1. In apparatus for molding and shaping plastic materials a trough, means for conveying lumps of material along said trough with a rolling action, means tending to force the material to the bottom of the trough, means for feeding lumps of material to said trough.

2. In apparatus for molding and shaping plastic materials, a trough embodying two walls, means on one wall for conveying lumps of the material along said trough, means tending to force the lumps toward the bottom of the trough, means for feeding lumps of material to said trough.

3. In apparatus for molding and shaping plastic materials, a trough embodying two walls, one movable horizontally relative to the other, means tending to force lumps of the material to the bottom of said trough, and means for feeding lumps of material to said trough.

4. In apparatus for molding and shaping plastic material, a trough, means for feeding lumps of material to said trough, means for progressing the lumps along said trough and means in said trough for continually drawing down the skin of the lumps toward the bottom of the trough.

5. In apparatus for molding and shaping plastic material, a trough, means for feeding lumps of material to said trough, means for progressing said lumps along said trough, and means in said trough for continually drawing down the skin of the lumps toward the bottom of the trough and means for striking down on top of the lumps as they travel along said trough.

6. In apparatus for molding and shaping plastic material, a trough approximately U-shaped and having one side composed of a conveyer-band and the other side of a rotating roller, means for feeding lumps of material to said trough and means for operating said conveyer-belt.

7. In apparatus for molding and shaping plastic material, a trough approximately U-shaped, an endless conveyer-band forming one side of said trough, inclined ribs on said conveyer-band, means for feeding lumps of material to said trough, and means for actuating said conveyer-band.

8. In apparatus for molding and shaping plastic material, a trough, means for feeding lumps of material to said trough, means for conveying said lumps with rolling action along said trough, an endless band adapted to receive said lumps from said trough, means located over said band for further rolling said lumps.

9. In apparatus for molding and shaping plastic material, a trough, means for feeding lumps of material to said trough, means for conveying said lumps with rolling action along said trough, an endless band adapted to receive said lumps from said trough, means for rolling and dividing said lumps.

10. In apparatus for molding and shaping plastic material, a trough, an endless band for feeding lumps of material to said trough, a guide-piece over said band, a knife located in said guide-piece, means for feeding said lumps of material along said trough and for drawing the skin of said lumps continually down toward the bottom of said trough during their progression.

11. In apparatus for molding and shaping plastic material, a trough narrowing toward its bottom, means for rolling lumps of dough along said trough and continually drawing down the skin of said lumps to the bottom of said trough, means for striking on the top of the lumps of material during their travel along a portion of the trough.

12. In apparatus for molding and shaping plastic material, a trough narrowing toward the bottom, means for molding lumps of material in said trough and a ram adapted to move up and down and strike on the top of said lumps in their travel along a portion of the trough.

13. In apparatus for molding and shaping plastic material, a trough, means for feeding lumps of material along said trough, ramming means adapted to strike on said lumps of material and move along with the same somewhat in their direction of travel.

14. In apparatus for molding and shaping plastic material, a trough, means on one side of said trough for rolling lumps of dough along said trough, means on the other side of said trough tending to force the lumps of material to the bottom of said trough.

15. In apparatus for molding and shaping dough, a trough, a conveyer-band forming one wall of said trough, roller means forming a portion of the other wall and a small roller located between the band and roller means forming the bottom of said trough.

16. In apparatus for molding and shaping dough a trough, means for conveying lumps of dough along said trough, rolls on the sides of said trough and a pressure-board adapted to descend onto and strike the lumps of dough.

In witness whereof I have hereunto signed my name, this 11th day of October, 1905, in the presence of two subscribing witnesses.

JOHN CALLOW.

Witnesses:
G. C. DYMOND,
HUBERT PUMPHREY.